United States Patent
Bonutti et al.

(10) Patent No.: US 12,197,553 B2
(45) Date of Patent: *Jan. 14, 2025

(54) ENCRYPTION, SECURITY, AND VIDEO OPTIMIZATION

(71) Applicant: P Tech, LLC, Manalapan, FL (US)

(72) Inventors: Peter M. Bonutti, Manalapan, FL (US); Justin E. Beyers, Effingham, IL (US); Marc Bonutti, Manalapan, FL (US)

(73) Assignee: P TECH, LLC, Manalapan, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/188,617

(22) Filed: Mar. 23, 2023

(65) Prior Publication Data

US 2024/0126852 A1 Apr. 18, 2024

Related U.S. Application Data

(62) Division of application No. 17/813,514, filed on Jul. 19, 2022, now Pat. No. 11,762,968.

(60) Provisional application No. 63/223,783, filed on Jul. 20, 2021.

(51) Int. Cl.
*G06F 21/00* (2013.01)
*G06F 21/32* (2013.01)
*G06V 40/70* (2022.01)
*H04L 9/40* (2022.01)

(52) U.S. Cl.
CPC .............. *G06F 21/32* (2013.01); *G06V 40/70* (2022.01); *H04L 63/0861* (2013.01)

(58) Field of Classification Search
CPC ...... G06F 21/32; G06V 40/70; H04L 63/0861
See application file for complete search history.

(56) References Cited

U.S. PATENT DOCUMENTS

| | | | |
|---|---|---|---|
| 9,679,126 B2 | 6/2017 | Warrier | |
| 2008/0158222 A1* | 7/2008 | Li | G06F 16/583 707/E17.02 |
| 2012/0016827 A1 | 1/2012 | Evans et al. | |
| 2018/0355837 A1 | 1/2018 | Bonutti et al. | |
| 2021/0374445 A1* | 12/2021 | Genner | G06F 21/32 |
| 2022/0172530 A1 | 6/2022 | Amadi et al. | |
| 2022/0237841 A1* | 7/2022 | Spencer | G06Q 30/0643 |
| 2023/0087879 A1* | 3/2023 | An | G06T 13/40 345/474 |

* cited by examiner

*Primary Examiner* — William A Corum, Jr.
(74) *Attorney, Agent, or Firm* — Stinson LLP

(57) ABSTRACT

Data encryption and Human Pose Estimation based on imaging a body segment. A key for encrypting a data file is generated based on image data that represent a unique biometric feature of a body segment of a user or motion of the user. An image engine executes artificial intelligence to identify matching image data for decrypting the data file. The image engine is further trained to predict changes in image data due to aging, stress, and the like. An avatar associated with the user, which is generated based on a movement pattern of the user, is configurable for generating an encryption key and for use in an avatar-based language.

16 Claims, 10 Drawing Sheets

ENCRYPTION, SECURITY, AND VIDEO OPTIMIZATION

CROSS-REFERENCE TO RELATED APPLICATION

This application is a divisional of U.S. patent application Ser. No. 17/813,514, filed Jul. 19, 2022, which claims priority from U.S. Provisional Patent Application No. 63/223,783, filed Jul. 20, 2021, the entire disclosures of which are incorporated by reference for all purposes.

BACKGROUND

Encryption is primarily used to protect confidential information. It can be used as part of a password protection system used to limit access to physical systems, software, or to proof identity. Many safety/security encryption systems use simple codes based on alphabet or numerical codes to protect information. For example, a person's social security number, which is a simple numerical series, is a key to many data files but can be easily acquired with risk of data breach or theft.

Known encryption methods also use mathematical transformations that are not easily understood or converted back without a key. Most encryption is a reversible transformation, where the reversal is known as decryption. Each encryption and decryption function requires a cryptographic key, which is typically a string of binary digits. In order for the encryption function to transform information into encrypted information and the decryption function to reverse the encrypted information the encryption and decryption functions must use the same key (symmetric key). Encryption is used in a wide variety of application, including but not limited to web applications such as Secure Socket Layer (SSL) and Transport Layer Security (TLS), Secure/Multipurpose Internet Mail Extensions (S/MIME), Internet Protocol Security (IPsec).

These types of protections can be stolen, copied, acquired through data hacks or breaches as they are known and stored by many companies (Apple, Google, Facebook, . . . ) as well as smaller technology operators that regularly request this information and then secretly keep files on individuals.

Those skilled in the art are familiar with the use of retinal scans, finger prints, and facial recognition for encryption, locking mechanisms, or security. Even high security techniques such as these uses static images, which are fairly commonly known and can be stolen relatively easily. For example, if one knows that a retinal scan is being used, one can copy that retinal image.

SUMMARY

Aspects of the present disclosure provide improved data security/protection by examining 3D images or patterns or motion 3D patterns of a user rather than simply static surface such as facial recognition. Depth—microns to millimeters into an object or body part—adds complexity to an algorithm for creating a cryptographic key applicable to any portion of the encryption and decryption process. For secure applications the key can be up to, for example, 192 bits. The key generated in accordance with aspects of the present disclosure can be stored by the user or can be stored by an application that uses a password or facial recognition or other technique to access it. Any or all concepts in this application that apply to encryption and key generation can also be used for password generation, controlling access to a device or file via passwords, and locking/unlocking physical devices or structures.

Moreover, these concepts can be added to any existing code, key, security, and/or encryption to add levels or layers for protection. For example, adding encryption based on a 3D image, pattern, or motion to an existing social security or numerical code overcomes the need for regularly changing the security system. In another example, if the user forgets a code or physical key (e.g., for a safety deposit box), a 3D image, pattern, or motion of a body or body part that "travels" with the individual provides an added layer of security.

Keys generated in accordance with aspects of the present disclosure also add the ability to personally encode security, codes, encryptions, etc. to any data package or data file as otherwise expensive third parties have to create these codes, which again causes risk for a security breach. In medicine, HIPAA privacy protection, for example, is improved as more and more patent information is passed via remote patient monitoring and remote patient care.

In an aspect, a method for protecting data comprises acquiring initial image data from a user at a first time. This initial image data represents a unique biometric feature of the user. The method also includes generating, based on the initial image data, a key associated with the unique biometric feature, encrypting a data file using the key, and acquiring subsequent image data from the user at a second time later than the first time. The method further comprises executing an image engine configured to determine whether the subsequent image data matches the initial image data. In this instance, the image engine is trained to create a confidence level for matching the initial image data with the subsequent image data. In response to the confidence level of the image engine indicating the subsequent image data matches the initial image data within a predetermined threshold, the method proceeds to unlocking the encrypted data file.

In another aspect, a method of creating an avatar-based language includes imaging a user and acquiring image data representative thereof and translating the image data for the user into an avatar that is representative of an expression of the user. The method further comprises storing the avatar in a centralized database and forming a blockchain to define and render the avatar in the centralized database.

In yet another aspect, a method of generating an avatar associated with a user comprises acquiring image data, which represents unique movements, from a user and identifying a movement pattern based on the unique movements of the user. The method also includes executing an image engine to generate a Human Pose Estimation based on the movement pattern and generating the avatar associated with the user based on the Human Pose Estimation.

Other objects and features of the present disclosure will be in part apparent and in part pointed out herein.

BRIEF DESCRIPTION OF THE DRAWINGS

Corresponding reference numbers indicate corresponding parts throughout the drawings.

DETAILED DESCRIPTION

Aspects of the present disclosure provide improved protection and/or security of data. These aspects relate to one or more of: 1) encryption, 2) locking mechanisms or security mechanisms to, for example, unlock a user's phone, car, computer, etc., 3) privacy issues to protect data and data transmissions, and avoid data mining, 4) addresses to be able to vary a user's email addresses, which also helps with either encryption or also help with privacy issues to prevent data mining of the user's interests, 5) a video language/alphabet, 6) distributed computing, and 7) blockchain or financial data to generate data or protect data especially through these financial sectors where people are using mobile currency type concepts.

Machine Vision and Recognition on 3-Dimensional Body Segments: Technology, whether used for unlocking of a cellphone based on facial recognition or transmission of secured data, requires an encryption key. This key is derivable from a retinal scan, facial recognition, fingerprints, etc., and allows a user to open a phone, for example. According to aspects of the present disclosure, encryption technology based on other parts of the body, minute facial and skin features, and body movements rather than simply facial recognition or retinal scan provide improved security for locking/unlocking, sending secured data, protecting information, and the like.

Figure 1:
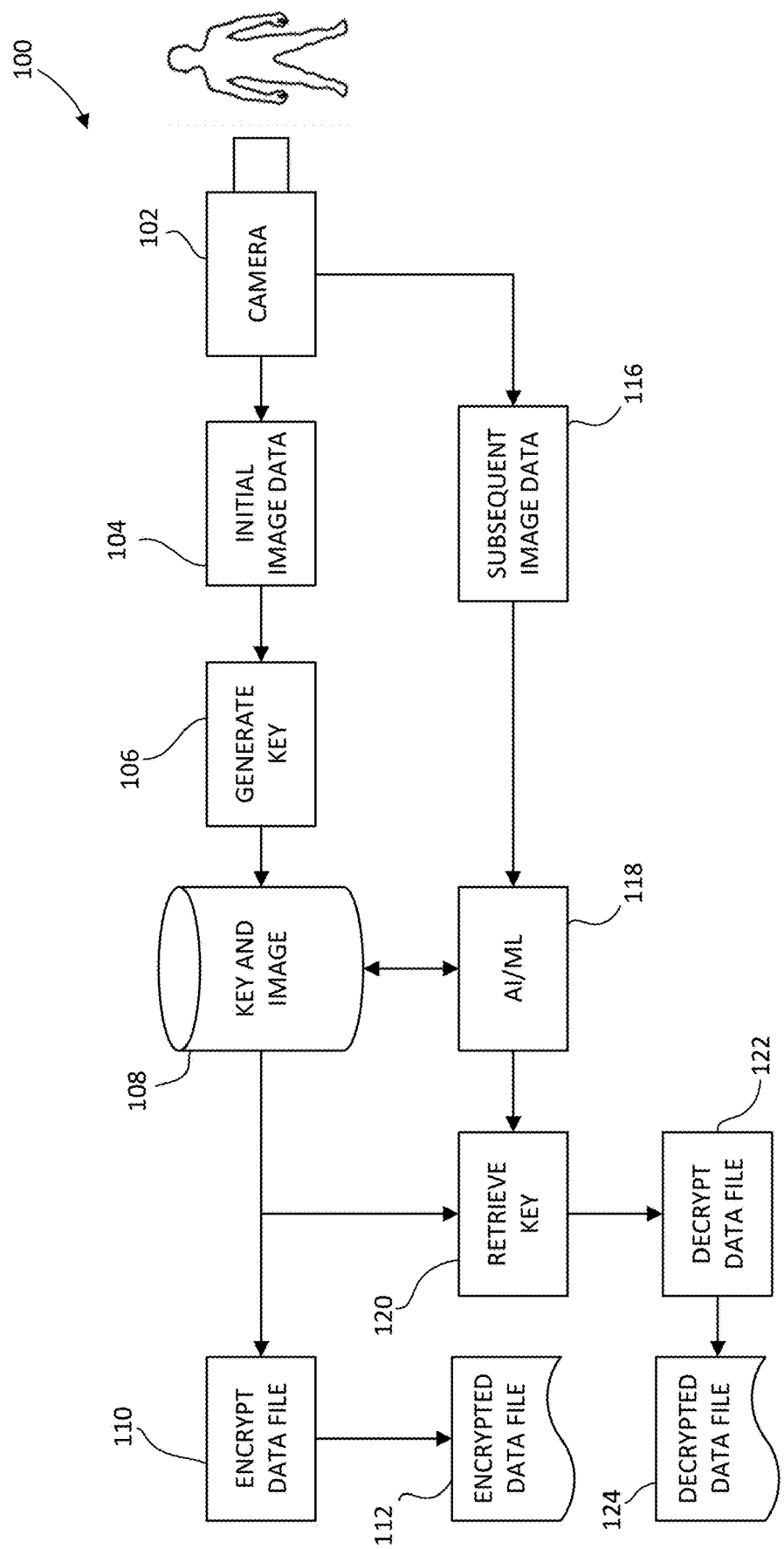
FIG. 1 is a block diagram of a system for encrypting/decrypting a data file according to an embodiment.
Figure 2:
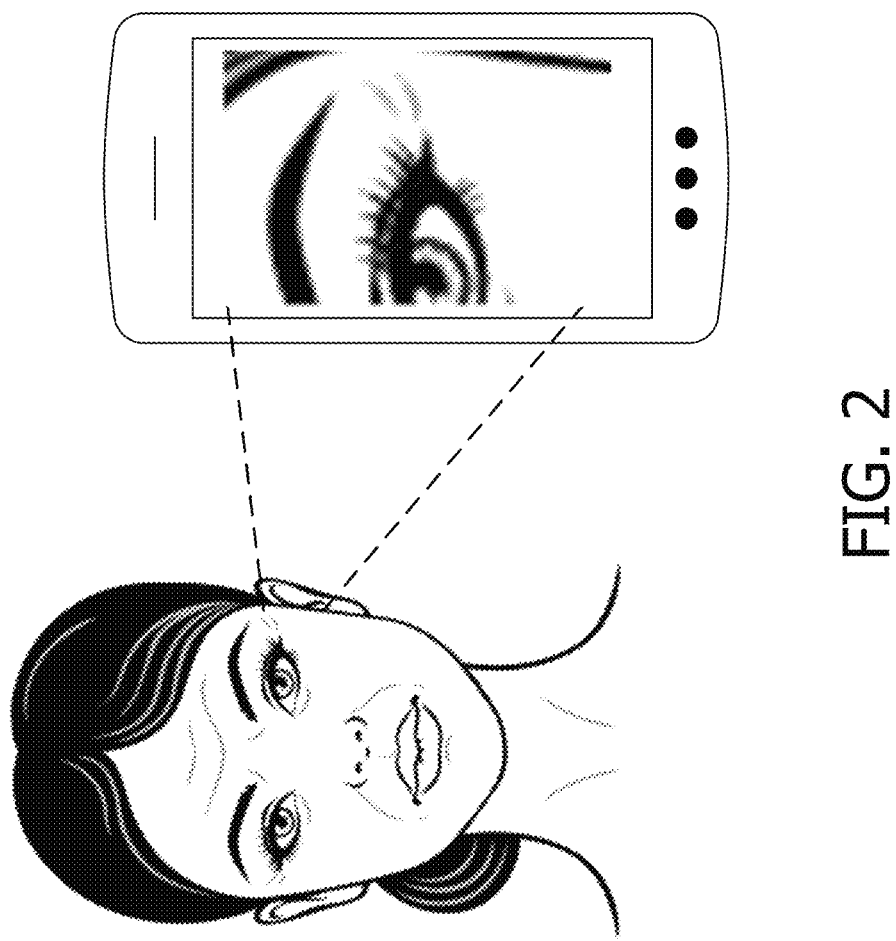
FIG. 2 illustrates acquiring image data for use in the system of FIG. 1.

As shown in FIG. 1, a system 100 executes a method for protecting data. A camera 102 acquires initial image data at 104 from a user representing a unique biometric feature of the user. For example, the surface of the body has unique qualities, for example, wrinkles under the eyes, number of hair count per certain areas, vascular patterns, or skin irregularities. In an embodiment, any of these features captured by the initial image data are capable of being used to generate an encryption key code at 106 associated with the unique biometric feature and specific to an individual user. Rather than using the entire face, one can magnify, especially with three-dimensional cameras on phones, to look at a specific area of the body or face, or to hone down to the wrinkles around the eyes, or to hone into the hair (i.e., around the face or ears, back of the hand, elbow, or knee) or nails. For example, camera 102 acquires image data for use in generating the key from a one centimeter area in or around the cheek, elbow, or knee looking not just at 3D skin creases but also looking at depth, vascular patterns, hair patterns, etc. FIG. 2 illustrates close-up image acquisition according to an embodiment.

Referring further to FIG. 1, the key and associated initial image data are stored at 108. The key is used to encrypting a data file at 110, thus yielding an encrypted data file 112. To later decrypt the encrypted data file 112, camera 102 acquires subsequent image data at 116 from the user. The system 100 comprises an image engine 118 for determining whether the subsequent image data matches the initial image data. In an embodiment, the image engine 118 is trained to create a confidence level for matching the initial image data with the subsequent image data. In the event the image engine determines the initial and subsequent image data indicate a match within a predetermined threshold confidence level, the key is retrieved at 120 for use in decrypting the encrypted data file 112 at 122. In this manner, system 100 unlocks a decrypted data file 124. On the other hand, if the initial and subsequent image data do not match within the confidence level threshold, the encrypted data file 112 remains locked.

Aspects of the present disclosure permit creation of a cryptographic key applied to any portion of the encryption and decryption process. For secure applications the key can be up to, for example, 192 bits. The key generated in accordance with aspects of the present disclosure can be stored by the user or can be stored by an application that uses a password or facial recognition or other technique to access it. Any or all concepts in this application that apply to encryption and key generation can also be used for password generation and controlling access to a device or file via passwords.

Mobile devices, including smart phones, tablets, smart watches, smart rings, and similar devices that are constantly with individuals can be used to identify, store, and record, data, upload data to the Cloud, and the like. Such devices can also limit access to the Cloud and store within the device itself for security and/or security reasons allowing Apps or options. For example, Apple currently loads everything up to the Cloud automatically. This can be short circuited in an App or program so that if one wants to keep this encrypted data within the device itself or these security mechanisms on the device itself it can block it from storing from automatically uploading to the Cloud. This is done more frequently in Android-based technology, which is not automatically uploaded to the Cloud; but this can be controlled by the individual for security and/or management of data.

Figure 3:
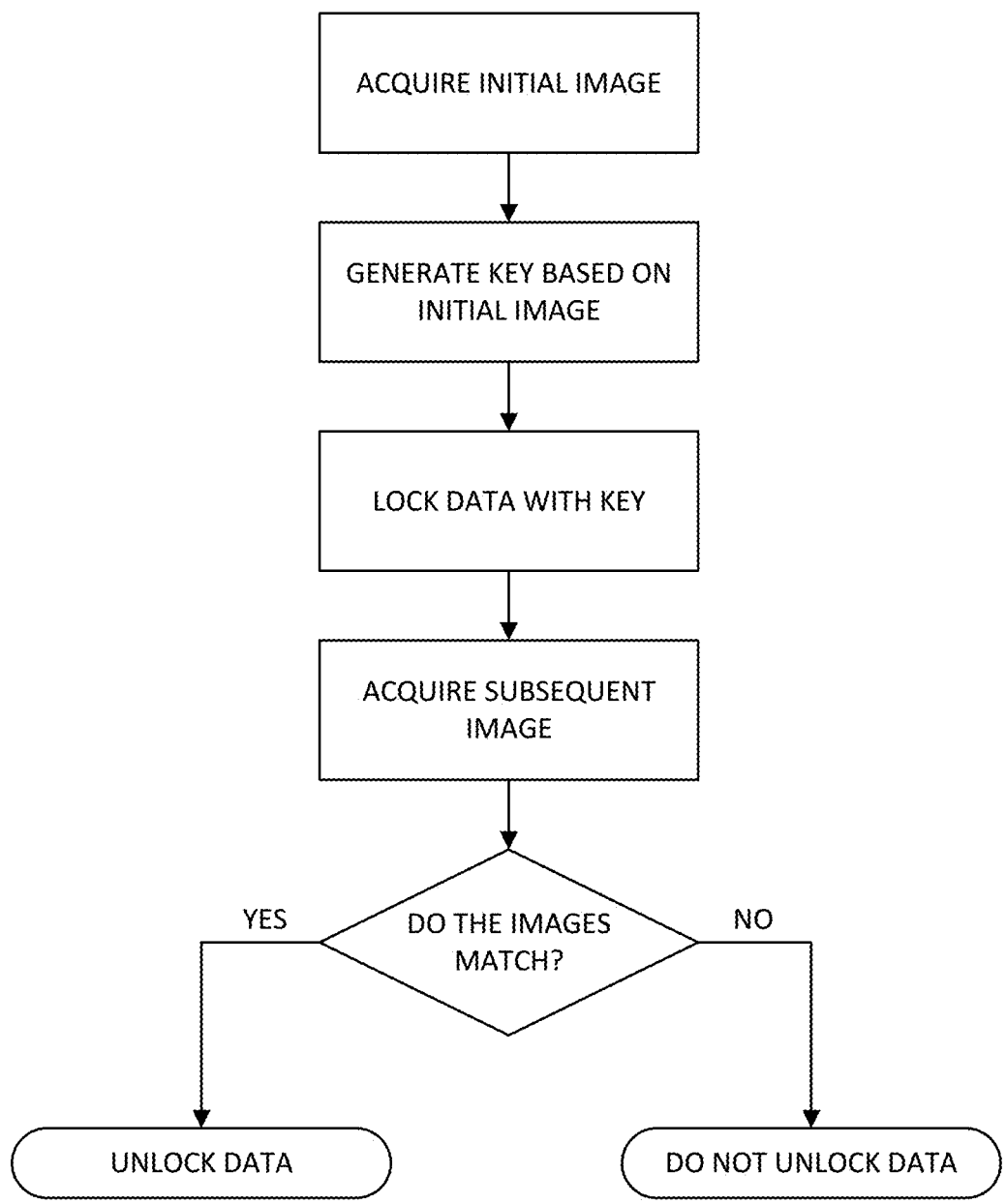
FIG. 3 is a flow diagram of an example process for locking/unlocking data according to an embodiment.

FIG. 3 illustrates process of FIG. 1 in the form of a flow diagram.

Figure 4:
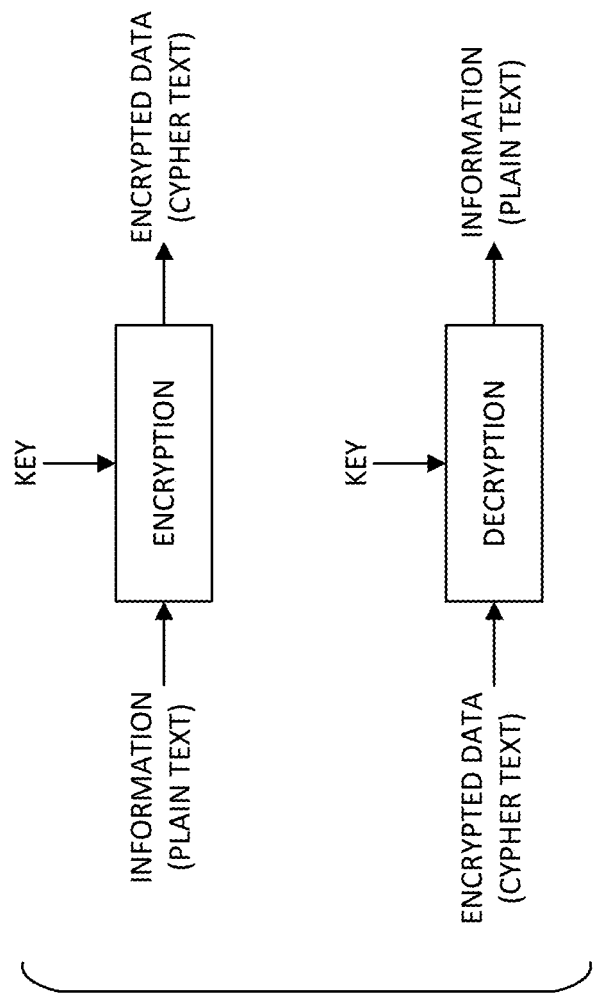
FIG. 4 illustrates encryption/decryption using a key according to an embodiment.

FIG. 4 illustrates further aspects of the encryption/decryption process in accordance with the present disclosure. While described in terms of locking/unlocking or encrypting/decrypting, it is to be understood that system 100 is configurable for other security environments. For example, the key generated by system 100 is configurable for validating electronic signatures, electronically locking and unlocking safety deposit boxes, and/or authorizing checks, bank withdrawals, credit card purchases, and the like. Aspects of the present disclosure are useful for anything in need of secure user authorization.

With respect to unlocking as described above, unlocking comprises unlocking a smartphone, unlocking a computing device, decrypting an encrypted data file, unlocking a vehicle (e.g., automobile, boat, airplane), and/or authorizing a transaction. For instance, a camera on the vehicle identifies an authorized user using patterns such as gait, specific motion pattern, voice, body part, etc. or combinations of these features to unlock the vehicle or even start the vehicle as the authorized user approaches rather than relying or a physical key or fob. A secondary lock may be used to permit placing the vehicle transmission into drive. Similarly, security locking/unlocking can be used to permit access to data, operate a robotic system, open an app, and the like.

It is to be understood that image data as referred to herein includes not only static images but also moving images, such as video. In addition, image data includes ultrasound, thermography to look at temperature/fluid parameters, Doppler, etc. As described above, conventional biometric recognition techniques base the encryption key on static images of the user's face, retina, or fingerprint. In an embodiment, the system of FIG. 1 uses specific sections of the body and/or captures video data associated with the user. Where the acquired image data comprises video, enhanced security is provided.

Infrared or ultrasound scanning certain sections either in 2D or 3D is available through recent technologies that are being embedded into smart phones or added on through mobile phones, smartwatches, etc. For instance, close up video captured by a 3D camera permits deeper recognition of the skin surface, skin creases, vascular patterns, or depth of the dermis. Moreover, scanning with different illumination such as ultraviolet, infrared, and other specific wavelengths reveals other unique characteristics, such as vascular patterns or vascular networks in specific sections of tissue. Different cameras of the same device can layer different information or detect different information in 3D to layer encryption or security. In such an embodiment, a first camera detects a first layer of information, a second camera detects a second layers, and so forth. Similarly, a video layer can be added to a static layer added to an IR layer and so forth. These techniques are suitable for use in generating a key based on either specific three-dimensional locations of body tissue. This combination of patterns can be static or can be moved to different locations. U.S. Patent Application Publication No. 2021/0353785, the entire disclosure of which is incorporated herein by reference, discloses a scanning algorithm overlay to show areas that have been treated and those areas that have not been treated.

In an embodiment, the encryption key is generated as a function of a combination of biometric features. Recent scanning technology permits creating the encryption key through arbitrary patterns or known patterns based on the user's body as the template and at specific locations. For example, the process starts by scanning a whole section of the body, i.e., the face, trunk, legs, or the entire body. Then, the process sequentially looks at patterns in one location or multiple locations in a more specific area to look at patterns and surfaces three-dimensional vascular, etc. scanning these with a mobile phone. These can be used then as a method for encryption, coding, key, etc. If initially looking at facial recognition, adding 2D or 3D image data of a section of the user's body (e.g., the ear, neck, etc.) provides improved security. One looks at these not just superficially but also skin creases in, for example, 3D vascular patterns. One looks at these in combination and is able to create new encryption keys, which someone can carry with them long term. For example, if the user misplaces or loses a computer system or mobile device, he or she can come back a year later and scan the appropriate locations to unlock device.

While scanning currently exists for bar codes or surfaces (e.g., facial recognition), handheld scanners in accordance with the present disclosure are configurable for performing a 3D scan for codes or transforming the scan to a mobile code to document items in inventory or billing or to create a moving code (e.g., video code).

Rather than just having a simple signature to double check, a video component can be added, including vascular patterns, skin patterns, dermal patterns, body part, or even location, environment, or space where one is signing this, to verify the identity of the person signing. 2D or even 3D pictures such as signatures, facial recognition, retinal scan, etc. again can be copied and are known and often stored in the Cloud so people can access them and potentially steal them. However, if something is specific to one individual's body or the environment where one is located, the combination of features can be used to further encrypt The specific body location from which the unique biometric information is acquired can change from time to time. In an embodiment, the location is moved around sequentially, as well to even further encrypt because of how the portion of the individual's body responds to movement. This is different from the state of the art technology because companies already have relatively broad facial data but this technology focuses on a smaller/deeper portion of an individual's body. Honing in on small body segments, such as 1-2 centimeter locations, with specific lights (e.g., infrared, UV, LIDAR, ultrasound, or varying light patterns) to look at the vascular flow patterns provides improved security. Similarly, fluorescence can be used to follow the blood flow and/or venous pattern, arterial pattern, or skin edema of the user, which can also change over time. Subjecting the user to multi-factor authentication (e.g., scanning other bodily sections to confirm the user's identity) before updating the user's changing body image data provides improved security. Rather than a retinal scan, which may be fixed for a period of time, surface irregularities and the like, for example, may change weekly or monthly. These can be linked to other technologies to allow one to protect data. Again, body segments can vary with light, location, surface topography, and surface irregularities, which can be picked up now with most cell phones having three-dimensional cameras. It is also considered that the detection of different attributes in different locations can be used to create a two factor authentication for access or encryption keys. This is expandable to multifactor authentication to compensate for aging, scars, where a certain threshold of authentication criteria must be met to unlock the device or give access to the file.

Referring further to FIGS. 1-4, some unique features of the user may change over time as the person ages (e.g., melanin levels, pigment, moles, added wrinkles, etc.). All of these can create personalized encryption or personalized security issues. In an embodiment, image engine 118 executes artificial intelligence (AI) to assess and/or predict changes over time, such as aging, changes in daily composition, changes in diurnal composition or during nighttime when one swells less than during the daytime when one is more active and tissue shrinks and mobilizes. Aging also causes changes in vascular patterns, skin crease patterns, dermal thickness patterns, for example. Advantageously, image engine 118 executes AI algorithms to compensate for this aging so that one can unlock or change despite these changes in body surfaces or body topography over time. In order to save some time for the user the AI can predict some possible changes so that the user does not have to update his/her avatar or go through multi factor authentication.

Figure 5:
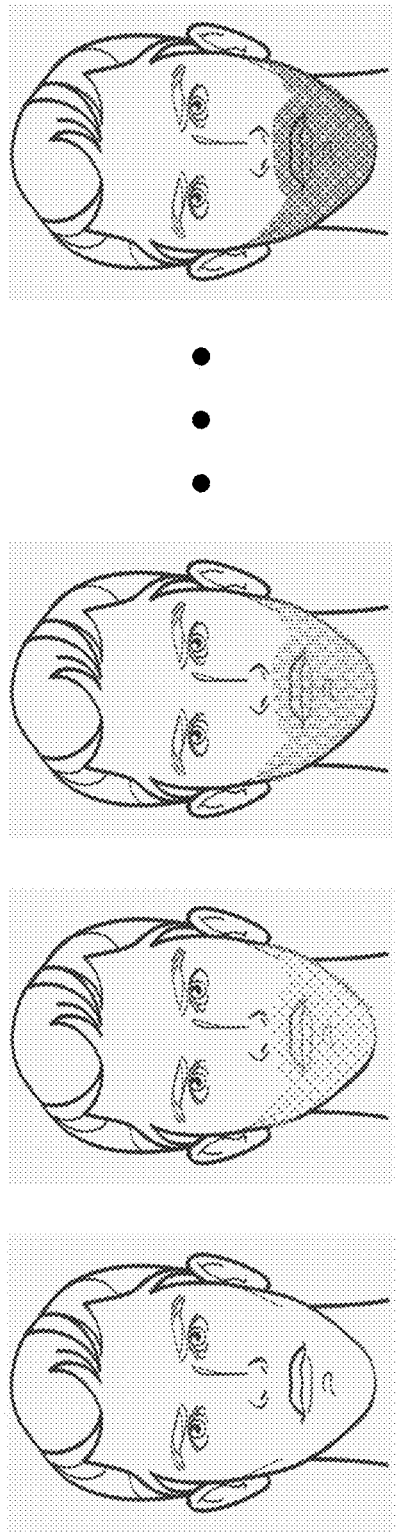
FIG. 5 illustrates an example of a user's changing appearance predicted by artificial intelligence according to an embodiment.

FIG. 5 illustrates an example of a user's changing appearance over time, namely, growing facial hair. In an embodiment, the AI is a convolutional neural network that has been trained on data sets from the general population to estimate aging, hair growth, beard growth, etc. A personal data set created by capturing images during each login over time provides additional information for training the AI. For example, image engine 118 executes AI to assess and/or predict how a hair pattern would change with aging, hair growth, or motion patterns and then encrypts this information. Similarly, image engine 118 executes AI to assess and/or predict what changes are with stress. For example, how skin or body approaches with activities change via stress or with epinephrine induction. This is either brought into the system or the AI is mapped to see how these would change with activities. The AI can also be used to predict growth, i.e., a beard, aging, hair patterns, or vascular patterns for vasodilatation, which can also be used for encryption. In other words, over a week or a month, body tissue and body surfaces, such as hair follicles, change as hair grows or skin creases. In the example of FIG. 5, image engine 118 implements AI to predict the user's appearance at a point in the future.

AI patterns also predict if one changes appearance through plastic surgery or Botox injections. Despite the aging process, these certain modifications can be adapted using the AI to understand and encrypt despite the modifications, and to predict how these changes would change themselves and manage this information. The image engine 118 also can process the image data to take measurements on hair per cubic centimeter, length, curl, angle, movement, and movement with static or electric changes. For example, when one has static electricity, hair changes. Such changes can be used to create an encryption pattern by applying different types of electrical, magnetic, or motion patterns.

Skin creases, wrinkles, 3D vascular patterns, etc., certain treatments and medications such as collagen injections and Botox, certain retinol creams, and the like may alter the skin creases/wrinkles. Potentially, medications may alter the vascular pattern in certain three-dimensional body segments that are the subject of scanning for this encryption. AI algorithms have been used for example to predict aging. If someone takes a face, they can look at an algorithm and they can suggest what that face would look like in ten, twenty, or thirty years as one ages. These same type of patterns can be used to break if someone has had collagen injections, retinol, and Botox, for example, and how this would affect wrinkling patterns as a secondary check for validation of this encryption technology.

Figure 6:
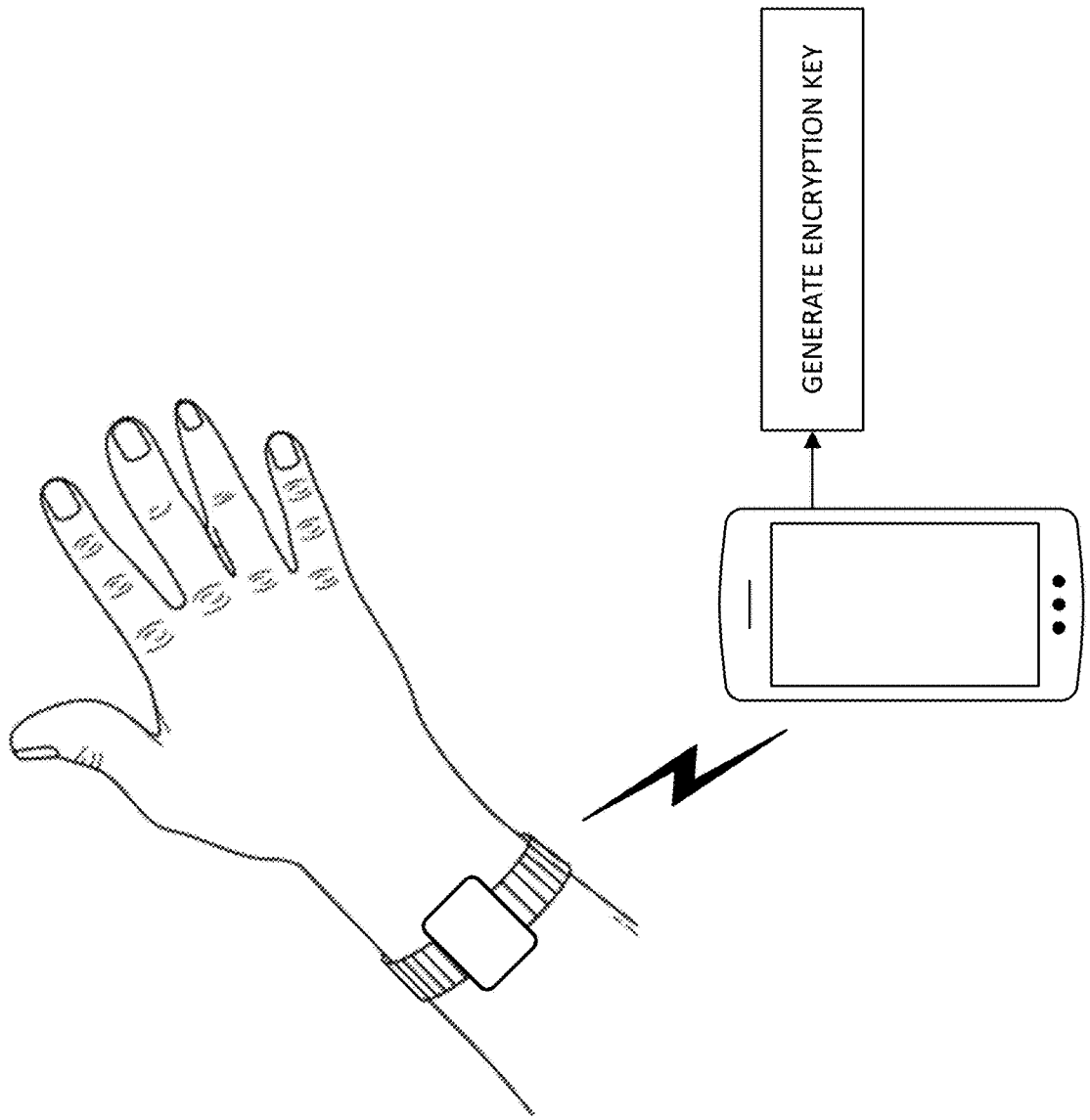
FIG. 6 illustrates capturing ECG data from a wearable for use in generating an encryption key according to an embodiment.

One embodiment can be configured for pseudorandom patterns for encryption so a user is not simply using facial recognition or retinal scans, but one can truly create a key where one day it may randomly go from an eyebrow to a section of the ear to a lower section of the neck and so on. The initial scan can be of the entire face, then future scans to lock and unlock can be a subset of the entire image. This can also be used to generate encryption keys. One can also then change the light sources from regular ambient light to strobe lighting to different light frequencies or wavelengths to capture different attributes. Another embodiment can be setup with a detailed video rather than a picture. Since videos with cameras now on mobile devices are very precise and accurate, one can do the detailed pictures with varying wave lengths of light. One can, as noted above, add different types of pigment, fluorescents, or coloration to the face either through lighting, makeup, or possibly ingestible material that might show the blood vessels locations. Infrared or ultraviolet can be used to look at surface and/or subsurface features. For instance, infrared can be used to tag blood vessels size, location, vascularity/vascular flow, thermal movement, and/or venous or arterial flow patterns. In the future, mobile devices may also have ultrasound, which can be used to scan deep tissue or image deeper body parts such as bone tissue, etc., and link these to other known encryption based technologies. For example, linking skin patterns, crease patterns, hair patterns, or vascular patterns with or without chemical patterns of an individual's body create multipart encryption protocols. One can also use, for example, pulse oximeter for looking at the oxygen content and vessel location. One can use light detection and ranging (LiDAR) that is being built into cell phones, for example, in addition to surface topography, video, and variations in light or motion patterns. This can be used in conjunctions with wearables such as the Apple watch to access the biometric sensors such as pulse, pulse ox, EKG, temperature. FIG. 6 illustrates capturing ECG data by a smartphone via a Bluetooth or other near-field link from a wearable, such as an Apple watch, for use in generating an encryption key.

There are new technologies that are being added on to motion or wearable devices that include enhanced three-dimensional cameras, optical coherence tomography (OCT), infrared, ultraviolet, or ultrasound. Wearable technology can be used to scan tissue body, environment, etc. to help with encryption communication, locking/unlocking technology. These also can be added potentially to medical data, transcription, medical research, recovery, etc.

Figure 7:
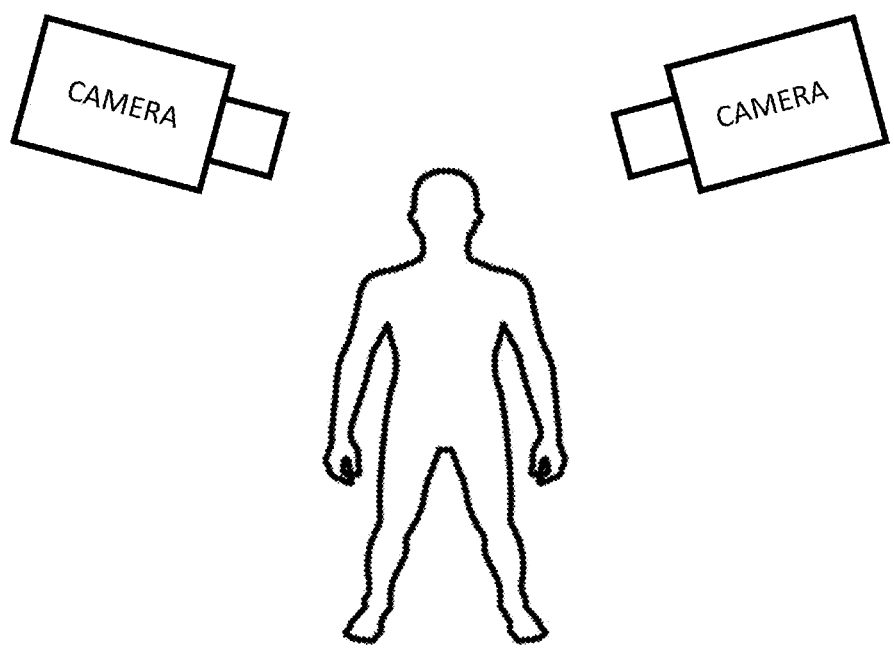
FIG. 7 a multi-camera arrangement for use in generating a Human Pose Estimation according to an embodiment.

Gait Patterns with Human-Pose Estimation (HPE): Gait patterns plus Human Pose Estimation can also be used to create encryption using the unique gait of a user so one can estimate a motion pattern or gait pattern. In an embodiment, a multi-camera arrangement, such as illustrated in FIG. 7, provides video data for determining the user's gait. To encrypt a gait pattern, acquired data represents 3D imaging and speed of movement (such as the movement of the legs and arms) as well as posture. In an alternative embodiment, a smart phone or wearable including an accelerometer provides acceleration data as the user moves in the x, y, and z directions. The output of the accelerometers (or from the Human Pose Estimation) can be converted from a 3D matrix to an encryption key.

One can combine different types of features: gait plus a section of the face on one day; a video of how neck motion occurs on another day; and a vascular pattern after one eats or exercises on yet another day. These various features and movements are detected in an embodiment by adding zone sensors or using wearable smart devices. One can also add electric charge, temperature, blood pressure, adding enzymes, sweat, chemical analysis, or linking tissues with skin surfaces with deeper vascular flow. For example, with any type of chemical or vascular analysis, ultrasound, or other known technologies which can be added to future mobile device systems. Mobile/wearable devices or intravenous/transdermal agent delivery systems can further enhance the deep tissue recognition which can be scanned with UV laser, ultrasound, or other known technologies to create unique patterns. Mobile or wearable devices can also be linked to the recurrence of a common feature. Energy patterns can also be used, such as electrical, magnetic, wind, or other known motion patterns or patterns that can simulate motion. For medical applications, differences gait patterns while completing an activity (such as walking or jumping jacks) can be used to determine what injuries the user might be facing.

Robotic or navigated systems which are directed to going from one section of the body or another can also be used for encryption, as opposed to randomly going from one section of the body to another. The robotic or navigated system can go from one body part to the next, scanning certain parts, accepting certain parts, and rejecting certain parts based on a premade protocol. For example, one may want to scan a one (1) centimeter section of the lop and then go to a one (1) centimeter section of the dorsum of the foot. These are automated, scanned, and noted preoperatively especially for encryption technology. One can scan deeper using infrared to see a vascular pattern/deep tissue pattern and combine this with chemical specific patterns for the body. For example, certain people have certain chemical recognition issues such as their glucose level, sodium level, or potassium level. This information can be compared to a digital twin for keys and/or encryption or it can be more encompassing for general use. The creation of the digital twin can require a complex multimodal scan of the user (ultrasound, MRI, cat scan, etc.). The digital twin can be used for recognition, but also for medical diagnostics or planning. The digital twin can also be created from the aggregation of pictures and scans used for unlocking phones and or files.

This technology can further be linked to voice, blood pressure, or locations. For example, if someone visualizes a certain portion of the body and a certain portion of a location at which they are located. The user can utilize either an external location combined with an internal location, as well.

In an embodiment, Human-Pose Estimation and encryption allow function of a robotic system and efficiencies in use of robotics whether it is in the Operating Room or for manufacturing applications to standardize between one individual and another. Looking at this for axial skeleton so one can use artificial and mixed virtual reality, mixed reality, augmented reality to allow specific activity patterns to be improved or made more efficient or require less energy.

This navigated system can go from one body part to another accepting or rejecting certain portions of premade protocols. If one is looking at this in the Operating Room, one can use this to educate or change the person's patterns to make them more efficient, more optimal, less stressed, and more function. For example, if one has dyslexia, one can power this to change dyslexia from an educational perspective via many of the concepts of encryption technology and can be used to educate patients with learning disorders. It can also be used in the same fashion to enhance function, work-related activity, under robotic systems, under exoskeletal, or under Augmented Reality/Virtual Reality.

This also may have substantial value, for example, in any type of self-driving vehicle. For example, one of the main issues with Tesla self-driving vehicles is that someone can hack into the system. This can be great recognition for more complex modality such as self-driving vehicles with complex computer systems, algorithms for encryption, or for something as simple as cell phone. One can do a scan backwards on the face and it randomly takes specific sections of a body part, either with still pictures or motion pictures, and then randomly look at specific locations, specific wavelengths, specific thermal patterns, etc. to determine the encryption and/or approvals. One can add standard encryption such as specific passwords or passcodes using emojis or avatars that are customized to an individual. By changing colorations or making mobile avatars, where the avatars themselves actually move for a fraction of a second or multiple seconds, a password/passcode is created. One can create an avatar and then connect the same avatar to a section of the face, body part, animal, etc. for encryption that includes multifaceted visualization.

Systems for Human Pose Estimation embodying aspects of the present disclosure provide the ability to view multiple body parts simultaneously and to store data for comparison at a later date. For example, a worker can be recorded in a specific series of motion patterns for body activity at the start of employment for comparison to later when the worker complains of an injury at work. Video data may be used to detect a preexisting but unreported injury. The algorithm compares new video to the older video to identify a preexisting problem to protect the employer and insurer. Similarly, aspects of the present disclosure can be used to identify gait and other changes possibly resulting from a neurological change to detect when an athlete suffers a possible concussion during a game, detect damage from a stroke, assess rehabilitation effectiveness following an injury, monitor improvements and recovery following a medical procedure or treatment (especially for remote medical care), and the like.

Insurance carriers are able to utilize HPE to compare and also understand if a patient is complying with care and/or if further funding for care is needed. Storing video data also includes facial activity, such as twitches and eye movements, that can be keys to pain management, response to medication, symptom magnification, and/or the need for medicines. This is especially important for rehabilitation with opioids or other pain medications and dealing with stress or anxiety. By storing video data and comparing to a baseline-created library that follows the patient, improved care is possible.

Avatar Human Pose Estimation (HPE): In another embodiment, avatar/characters are created by using Human Pose Estimation. By taking still pictures or videos of an individual and using Human Pose Estimation type concepts, an emoji-type figure or avatar can be generated. The avatar can be a static picture or can be a motion picture of estimation of an individual's face, body, arm, etc. One can also use a motion avatar. In other words, the avatar may have a single plane, multiplane, 3D plane. There can be moving patterns. The avatar can be built off the camera on the user's phone by winking, moving lips or face, or the like. An avatar can be used then to create an emoji based on the avatar, but this is a motion symbol. One converts this to a letter or a number essentially or create a code. This can be used in replacement of an alphabet so each avatar or emoji can be a letter of the alphabet or a number specifically. This can be used to substitute for an alphabet and this can be used as a code. It can change on a daily or weekly basis.

Aspects of the present disclosure permit recognizing and creating an avatar pattern that moves in a single plane, two planes, or in three planes (3D) by controlling rotation and linking the HPE to other data patterns. Simple cameras that can be used on a mobile device or known systems for chemical patterns recognition or multiple factors either in random or unspecified patterns can be used to drive the transmission of data encryption. This can link with the colors, motion patterns, etc. to create encryption or data transmission issue. This can also be used with electrical patterns to move hair follicles or magnet patterns to be fixed or utilizing motion, color, or background to link this. This can be three-dimensional statics or three-dimensional video to create the language for encryption based approaches. This can also be done for an animal or other moving part. It can be done externally for an environment to create a customized avatar figure that can then be used for encryption or other technologies.

One can create avatars off cameras, mobile devices, etc. These can be single 2D pictures, 3D pictures, or avatars through motion. Rather than merely using an avatar to describe an activity, one can use the avatar as a way to communicate or a way to dispense education/knowledge or to change the way language is performed or utilized by creating figures rather than alphabet. They can be static or motion-based avatars that one can use out of their own body or someone else's to create a language or barrier by creating certain figures that mean certain words or activities. These can be standardized despite changes in traditional languages are alphabets. The avatars can be simply done with an individual talking, speaking, or moving. The avatar is based on the user's particular activity either scanned or changed into an avatar and linked to a communication system or language system to help individuals communicate to encrypt data, store data, etc.

DNA/RNA: DNA/RNA encryption can also be utilized in the encryption (i.e., a DNA pattern can be scanned). The DNA/RNA patterns are especially compatible with computer/mobile devices. This can be through the mobile device or attachment to the mobile device where someone might insert some piece of body tissue, fluid, blood, etc. One can use Crisper technology in the body to infuse, change, or assess disease transmissions. Crisper technology can be based on mobile devices or computer based systems to assess not just encryption or language but also to be able to assess specific patterns on the surface or within the body. This can be used for therapy or diagnostics for cancer or abnormal tissue. It can be used for language or features, as well.

Optical Computer Tomography or Optical Coherence Tomography (OCT): OCT is used currently in optometrist and ophthalmologist's office to enhance visualization of the retina/eyes for assessments. According to an embodiment, a portable OCT-based system, either in a backpack or even smaller (such as in a mobile device or wearable) can scan not only fine surfaces but also provide a 3D scan or 3D video. Nokia Bell Labs has a portable, battery-operated OCT system for pathogenesis and monitoring of disease progression suitable for generating 3D images for use in accordance with aspects of the present disclosure. This allows one to look very close at functional activity, surfaces, depth into tissue/around tissue using OCT technology. It may be another that can be built into a wearable or mobile phone concept or can be used for diagnosis, treatment, and therapy, especially relating to encryption-based technology. These can be implemented in a mobile device. It can be in a small separate device that can enhance encryptions by looking at surface and depth of tissue even going small not quite to molecular level but getting down to smaller surfaces in 2D and 3D and being able to assess any changes or variations. This OCT technology with cameras and scanning can be used to look especially at depth into either encryption but also into education, stress, functional recovery, etc.

Environmental Conditions: Environmental conditions such as looking outside, looking at the wind pattern against trees, water motion, grass patterns, etc., can also be utilized for encryption through choosing which body part or exercise the system wants to check. One can look at dirt patterns, stain patterns on a wall or window, or complex environmental issues that include motion patterns of animals, (i.e., moving around or running) versus a specific background. These can be used sequentially with known standard encryption systems such as facial recognition or other factors to determine if still pictures, motion pictures, change in light patterns, etc., are used in an encryption key or code with a known factor or unknown factor. For example, lava lamps in the past have been used to create random number generators but their patterns have been difficult for the user to encode. One can use wind pattern, for example, looking at tree motion, water motion, or wave patterns to create a random number generator, as well. It can be anything that one can look at through video or through multiple still pictures and place them together. This can be used as these type of random number generators, but it also can be used to generate privacy or locking mechanisms on a vehicle, phone, computer, etc. for protection.

Eventually mobile devices including potential for OCT can scan at a cellular level, molecular level, and potentially even DNA at some point. This allows one a new way to look at encryption but also to look at function, recovery, and assess at the same time with wearables and/or chemical sensors, body fluid, hair, functional activities, etc. These technologies can assess and assist with any type of therapeutic treatment. For example, like CRISPR so one is able to look at technology patterns even deep inside the human body or at a more molecular level for many of these conditions.

This technology is an improvement over the previous technology that are used in facial recognition because traditional solutions are focused on topographical features and not fine granular features. The current encryption is not based on specific structures such as specific patterns within the skin itself, hair patterns, vascular patterns, creases, colors, etc. These can also be linked again to other environmental conditions, DNA encryption conditions and others. These can be predictable to unlock phones, look at aging patterns, start self-driving cars, and for encryption of data (public/private key). In one embodiment the determination of anatomical features can be implemented through a machine vision and artificial intelligence. In the preferred embodiment, the determination of the facial features, subcutaneous facial features, or any biological feature can be determined with a neural network. The neural network can be trained with both the user data and a labeled or non-labeled data set of features that are used for encryption or access. For unlocking the encryption data or device, the compared input data is compare with the trained CNN and a confidence factor is returned indicating the likeliness of this matching the biological feature. This confidence level can then be compared to a threshold to determine if the captured image should allow access to the protected data. The threshold can also be determined by a convolutional neural network which can be used to compensate for changes in appearance such as growing a beard. In one case the threshold of confidence can be separated into a portion of the face without a change and a portion with change (i.e., a beard). The two results can be weighed or used separately. In another embodiment, instead of compensating for the change by adjusting the confidence level or sample size of the face, the convolutional neural network can be trained such that these changes can be included in the confidence level. In another embodiment, the confidence level required to unlock or decrypt can decrease with time. This time can be based on a time period or on a biological parameter.

It is also considered that the facial recognition and human pose estimation can be used to create more complex passwords than just recognizing the person. There have been known cases where facial recognition passwords have been compromised by using masks, pictures, or even unlocking a sleeping person's phone by pointing the phone at them. To create a more secure system, multi-level recognition can be required were the user is able to use a predetermined amount of poses or set a custom amount. To successfully unlock the file, device, or authenticate the person is required to repeat these poses in order. For example, the user might set their password to smile, wink, wave, frown. The poses can be separated by a certain amount of time, where all must be done in a timed sequence or each pose can be evaluated in a state machine.

Because computers are essentially binary, zeros and one, one can create novel forms of data compression to reduce the data and then one can add these and code these into digitized avatars that can be used as new mechanisms to transmit and store encrypted data. These avatars can be based on individual motion patterns or on video clips, for example. It can be two-dimensional or three-dimensional. There are companies such as RADiCAL that can assess range of motion in 4D, including time and acceleration, and then allow these to be projected and/or stored on avatar for specific motion patterns or activity patterns. These can then be used for data encryption and data storage, but also can be used in numerous medical applications for documentation. For example, surgery and assistance in helping people recover as well as rehabilitation. This can be used also for medical documentation. It can be HIPAA protected as they are stored to the Cloud. These can also be used as specific examples to allow one to create a baseline. If there are any deviations or changes, one can identify defects. For example, an athlete who may have a concussion, one can follow them through video clips and audio clips. If there is a change where one loses memory or activity changes such as stumbling or falling, one can compare these activities and then determine if one in fact has had a concussion or not. These can be used for neurological evaluations. For example, during or after a stroke or if someone has had a specific disease or event and how they recover afterwards. These can be logged to create a baseline in the Cloud and then look at these functional activities later to assess musculoskeletal conditions, neurologic conditions, functional recovery, sports, activities, etc. to monitor improvements or delays in activities and/or assess mechanisms for improvement and where those are. One can identify multiple joints throughout the entire body, including facial issues where someone can see grimacing, pain, stress, etc. through the eyes or face and then also motion patterns to see how simple, easy, and fast using acceleration to assess these. These can be added on as an addition to traditional Human-Pose Estimation looking more at 4-dimensional approaches and further. These can be used off simple mobile devices. Sensors or wearables can be added to enhance these to look at other features including biological features, biometric features, etc.

Figure 8:
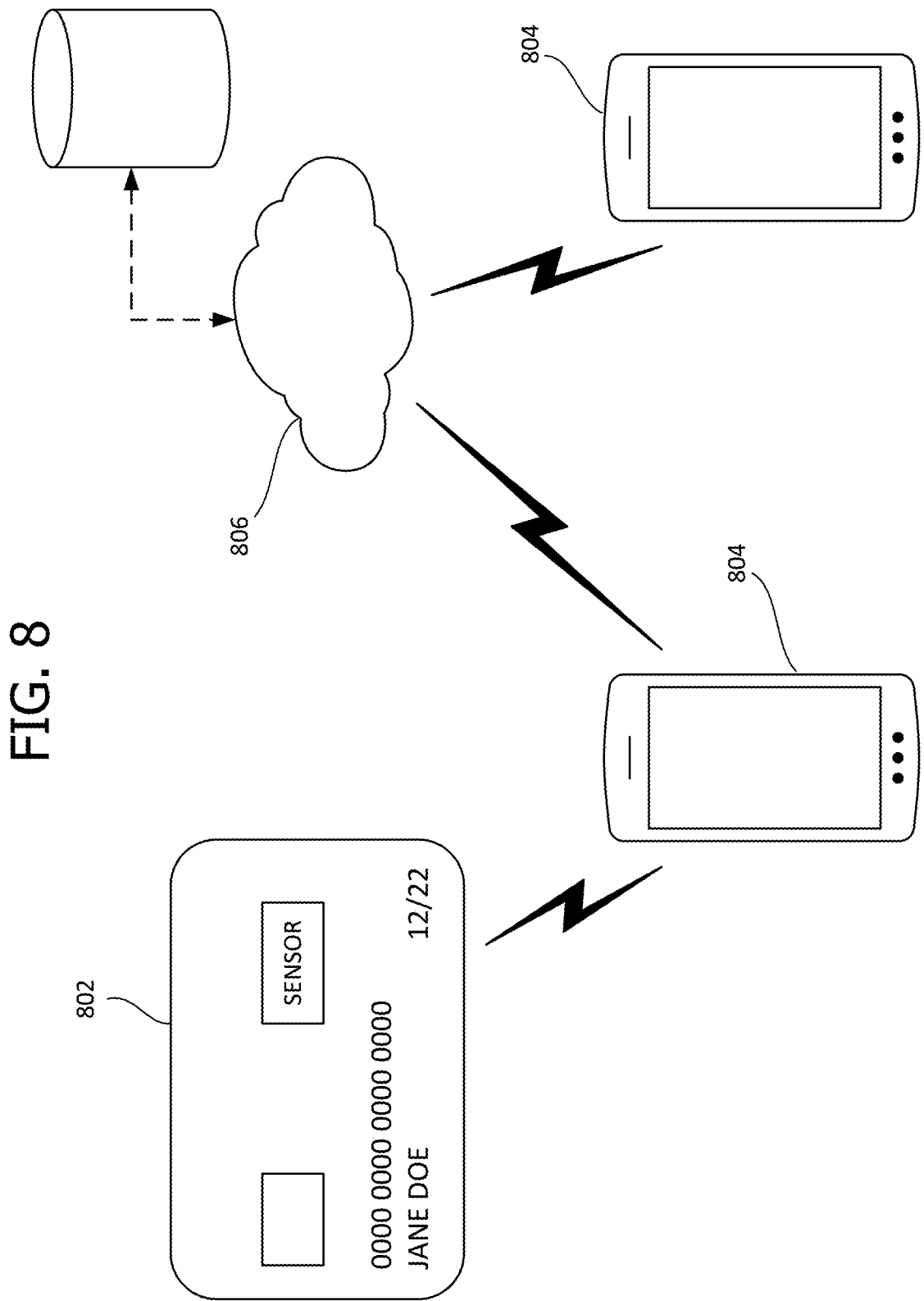
FIG. 8 is a block diagram illustrating a system for authorizing a user based on the encryption key according to an embodiment.

Referring now to FIG. 8, in another embodiment, aspects of the present disclosure monitor additional other changes for irregularities for security reasons. For instance, a credit card size device 802 can be created with antennas located to interact with credit card stripe readers. These sensors are used to detect the presence of a second magnetic coil for reading the credit card strip by looking at the expected eddy current and changes in the magnetic field when compared to one magnetic strip reader. Secondary readers are hidden in legitimate credit card readers to "skim" the financial information of an unsuspecting user. One embodiment of this device can have a simple LED interface to display if the reader was safe to use or if there was a credit card skimmer present. In another embodiment, as illustrated in FIG. 8, the credit card device 802 contains a Bluetooth or Bluetooth Low Energy radio for interfacing to a smart phone 804. The phone interface can be a simple visual indicator of the giving a binary (safe/unsafe) indicator for the credit card reader or, alternatively, a confidence level of security can be displayed. In another embodiment, the information about the eddy currents and magnetic fields detected can be sent to the phone 804 for further processing. The phone 804 processes this data to determine the security level. It is also considered that this data can be uploaded to a central repository or the Cloud, indicated generally at 806, to create a larger dataset that can be labeled as suspected skimmer or an unlabeled set.

Using known techniques in artificial intelligence, such a convolutional neural networks, the uploaded data can then be used to train an AI for more robust detection, returning a confidence value corresponding to the security of the credit card reader. It is also considered the GPS location of the scanned credit card reader can be uploaded and shared with other users. With this centralized database, the system can send push notification to other users who are within a predetermined geographical distance to credit card readers suspected of skimming. Alternatively, the application can regularly download the entire dataset or a subset of the data of known skimmer locations based on current geographic locations, and a geofence can be created around suspected skimmer locations. If the user crosses the geofence, a notification (alert, popup, vibration, sound) can be sent to users to alert them about the suspected skimmer. It is also considered that based on previous detection of skimmers at a location, or ones in close proximity, that there is a predicted risk at a location instead of only reporting detected skimmers. Alternative embodiments can use WiFi, RFID, ZigBee, or other wireless protocols for wireless data transfer. If a skimmer is detected at a location, the software can allow the business user to have the alert removed from the database or marked resolved after it was removed or investigated. In one embodiment, the application can give the option of flagging or canceling a credit card that is suspected of being skimmed.

Another embodiment is a scam alert system (app, website, identity, banking, etc.) that alerts (a warning/alert) both consumers and companies about scams. This can also include other types of scams including ticket scams, phone scams, etc. This can even include informing law enforcement to further investigate. This can also include map of where scams are most prevalent and a rating scale of the likelihood of it being a scam. There is also a rating system for low (possible) medium (multiple reports) or high (proven)scams, locations or business/individuals. This can be packaged onto a website or app that automatically alerts users to a number, location or business that contacts individual or that individual may contact and rate the risk.

Figure 9:
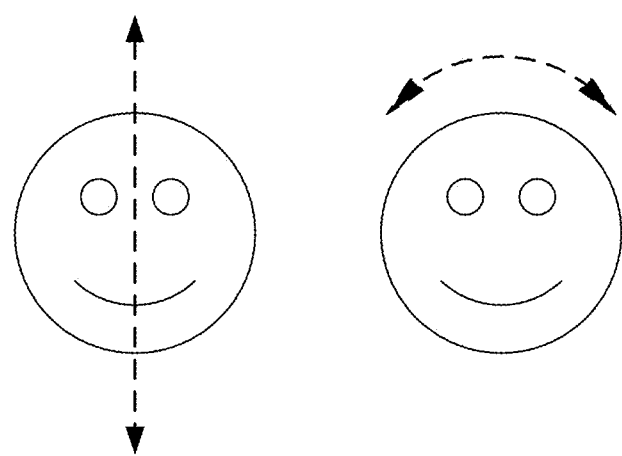
FIG. 9 illustrates two emoji-type avatars with movement according to an embodiment.

Referring further to avatars and/or motion avatars, aspects of the present disclosure contemplate their use for language encryption and even blockchain-based technologies. Use of a motion or character that has some limited movement can enhance and shorten communication, create a more versatile and universal language free from static language bias (e.g., bark can be either a dog sound or covering of a tree) that must be interpreted in context of sentence, paragraph. Motion characters—avatar being one type—may enhance communication and specificity despite language or dialect or regional differences. Language is based on static characters or symbols (i.e., ABC), which are static and limited. There can be an emoticon dictionary containing one or a combination of avatars to help create a universal language and clarify what the avatars mean for all languages. This can also include cultural differentiation of the meanings of avatars. One example of this a common gesture when a person from South Asian cultures where a tilting the head from side to side can mean "yes" or "good". In other cultures, this nonverbal communication is done by moving the head up and down. In one embodiment, animated avatars can automatically update to reflect cultural shifts in the meaning of the motion or emotion being conveyed based on geographic location, keyboard language, or context. For example, FIG. 9 illustrates two emoji-type avatars, one that nods up and down and the other that rotates side to side. These avatars can have different colors. One can add certain symbols, numbers, or letters. It can be used to create an international language, for example, using avatars, either single avatar or motion based avatars. Avatars can be used with other figures or symbols next to them so one can create a language for communication, technology, encryption, trading, transmitting data, or sharing of information. This can reach international lines as avatars are transmitted in a binary code through the computer. However, they allow individuals to communicate with different languages, different cultures, and different alphabets. This may be a way to create a language and can be added on to quickly so that users of avatar language can become fluent easily. Varying of the color, shape, or background pattern can be implemented as well. For example, polka dots versus flat background versus different color schemes. One can use a three-dimensional avatar single plane, multiplane, motion plane, rotational plane.

In an aspect, the use of avatars can remedy the discrepancy of language where one word may have multiple meanings in different languages. One can also use avatars where motion patterns can be then downloaded via mobile devices for example and whether these are simple facial, entire body, or activity. It can be done either through motion or static figures. It can be logged on as an avatar and then create language or encryption based technology on these motion devices. They can be other universal characters so that specific languages and/or alphabets can be bypassed for a more international discourse. In the past, all static symbols have been used for different alphabets whether Chinese characters or Roman alphabet figures. Here, static images and/or motion images singularly or in combination create nouns, verbs, and adjectives through avatars (moving or static) or in combination with traditional alphabets to try to make more universal language or communication.

Avatars can also be used for distributing/computing via blockchain using new language keys. They can be used in single or multiple computers. They can be used for cryptocurrency, NFT, or as a way to assess or enhance blockchain rather than using standard alphabet or characters, which have significant limitations.

Aspects of the present disclosure also can combine an emoji from a camera (such as shown in FIG. 7) where one creates language patterns by scanning facial, body, or motion features linking these to some type of emoji or video feature and then these can be encrypted and moved. To create a more descriptive emoji the person can have his avatar added and/or emojis added on top of other emojis, resulting in a set of action emojis to best describe what the person intended. Rather than just an emoji, it can be the user's own personal avatar that comprised of, for example, a scan of the user's own body downloaded into specific features in binary 1's and 0's. They can be amplified. It can match what your body is and this can be used for language, data transmission, encryption, or protection. These can be used also to integrate encryption technologies for communication. This language can be used for medical information transfer, technology, and other applications.

An avatar and/or audio can be used for this language communication. One can use these for financial data, for assessing problems, to control data, and to add other features for smart phone encryption. One can use these for example in DocuSign. Rather than a simple signature, which is 2-dimensional and can easily be copied or forged, one can use a three-dimensional system and adding many of these other encryption-type features to enhance DocuSign. This can also be used on a check. For example, if one wants to communicate this or for a credit card rather than a simple chip, one can also link the chip to your mobile phone where the mobile phone takes a video of you and/or your specific motion patterns and/or section of skin, facial recognition, multiple aspects, etc. that can ensure one was using the credit card, one was writing the check, or one doing the DocuSign actually is the individual doing it. This is proof either at the time through a delayed management where one can double check this through a Cloud-based approach or it is stored for proof later for legal issues, government issues, police issues, and the like to prove or disprove that one in fact signed the document, agreed with a certain activity, or legally accepted a certain contract. This can also be further used for verbal contracts or verbal communication where someone says "I agree" to this. One can also scan the individual body as well looking at the face, eyes, or a multiplicity of these encryption-based approaches. For example, did that individual in fact approve of this? The user can then store and download it into the Cloud. One can prove that individual by certain motion patterns, chemical patterns, functional patterns, or body patterns and not just acoustic sound, simple video, or simple signature. One can prove individual based on further encryption technologies that proves this was the individual and that they did approve a certain activity, function, financial transaction, etc. This is also a novel way to look at credit cards, credit card authorizations, check authorizations, and make this more personal going back to the first paragraphs and discussions on encryption based approaches.

Credit card theft is massive. If the credit card links to your mobile device, the mobile device then has a particular pattern as well as has audio/video approvals and immediate understanding. One can double check those patterns with the individual himself/herself did approve this transaction and this is proof. Credit card companies can see this over the Cloud rather than simple text message that confirms this or does not confirm this. It is an actual picture with e-mailed video of these encryption type technologies and can be used to confirm the individual did approve it and/or later for credit card companies to send billing and confirm this is the individual that did this and they do require these type of payments. This can be used for legal and/or financial transactions and/or proof of these.

This can be evaluated and stored on a phone or compact flash. It can be stored in a computer. It can be carried with you and information can be stored to flash memory rather than to the Cloud for encryption or security.

In another aspect, Human Pose Estimation links to an emoji or an avatar that one can use for encryption. People have specific motion patterns that are not just their movement, but also to acceleration and rotation. As users change or age, their patterns of activity (whether in upper or lower extremities), motion patterns, facial tics, etc., can then be downloaded to an avatar or emoji to create language issues. It can also be used for privacy or encryption issues or for data transmission. These can be varied on a regular basis to help even with privacy issues, so that companies are not mining all your data from your e-mails or a cellphone. When utilizing this, one can modify activities to confuse, preserve data, and prevent social media from mining, thereby creating a moving target. One can use these same types of concepts as they relate to environmental factors, personal factors, motion factors, or linking HPE and others to present multiple addresses (either single source or multiple sources) to block data mining and/or create facets for privacy. Again, this can also be used for wealth preservation and/or financial issues through blockchain or other financial institutions that allows mobile funding. In addition to using this information as a key or password, the generated codes in the disclosure can be used with known VPN or anonymous browsing tools as TOR to anonymize browsing and protect personal data, and can also be used for Blockchain.

This can be used to prevent browser theft of data creating mobile addresses from spreading out to other addresses. This can also be an end-to-end encryption technology or can link random codes to fix codes. This can be audio or video or linking both. It can be linked to an avatar which can be walking, gait, bouncing, rattling sound, motion, shaking, etc. As described above, a smart phone or wearable including an accelerometer provides acceleration data as the user moves in the x, y, and z directions. For example, a cellphone in your pocket as you move around may create a number of different issues as it relates to motion picked up by accelerometer or gyroscope. It also creates a sound as it rubs against certain materials and/or video. It may be able to create these motion patterns with or without Human Pose Estimation or avatars to create data links, encryptions, privacy features, mobile addresses, etc. These concepts are linked with additional data to either train neural networks to create encryption values, to create locking mechanisms, to create end-to-end encryption technology, to create varying addresses, to create a new language, or for distributing or computing. It can be used for mobile financial networks as examples that require huge data power, as well as a lock or key for encryption or encryption-based approaches.

It is also considered that as a lexicon of emojis are built that it might not require a centralized database to host the images or dictionary for these emoji. By leveraging blockchain, this information about usage, definition, or graphical rendering of new icons can be updated through blockchain's distributed ledger. The computational burden by adding blockchain can be performed by multiple methods. In one embodiment, the user can run some computations while the incoming data is being loaded and/or displayed. In other cases, the computations can be done offsite. These computations can be supported by ad revenue in an application or fee for use. These computations can also be used to create the electrical energy required to mine cryptocurrency or utilize blockchain or other types of technologies. U.S. Patent Application Publication No. 2018/0355837, the entire disclosure of which is incorporated herein by reference, discloses capturing energy from natural resources, such as movement of fluid in a body of water, and converting it into electrical energy. The language developed in these processes can be used in advertisements, arts, NTFs, or other applications. These can then be used in finances, recognition, or different types of communication that protect individuals or direct specific individuals.

Rather than audio to create language or communication which is based on multiple alphabets languages and dialects, here a language is created by Phone/Mobile Video systems that monitor movements and convert movements, activity, color, or motion to a "video language". Thus, it is interpreted by machine learning or AI algorithms on receiving side and directs the user as to how to create or educate on "language". A simpler and faster way to communicate is thus created, especially since smart technology so ubiquitous. One can also add audio, emoji, or multiple features rather than linking to a single feature. On the language side this can also be a new way to program computers or transmit information rather than the typical 0 and 1 binary code, where instead computers that can communicate with more than 2 symbols—for example a clock face with multiple positions and or the motion or color or 3D interpretation HPE—has led to the concept that computers can recognize motion rather the traditional on/off 0/1 binary code, which has limits. Also, the processor is changed to accommodate multiple layers, like a 3D chessboard or tic-tac-toe in 3D, and a user can connect in different directions or angles.

Figure 10:
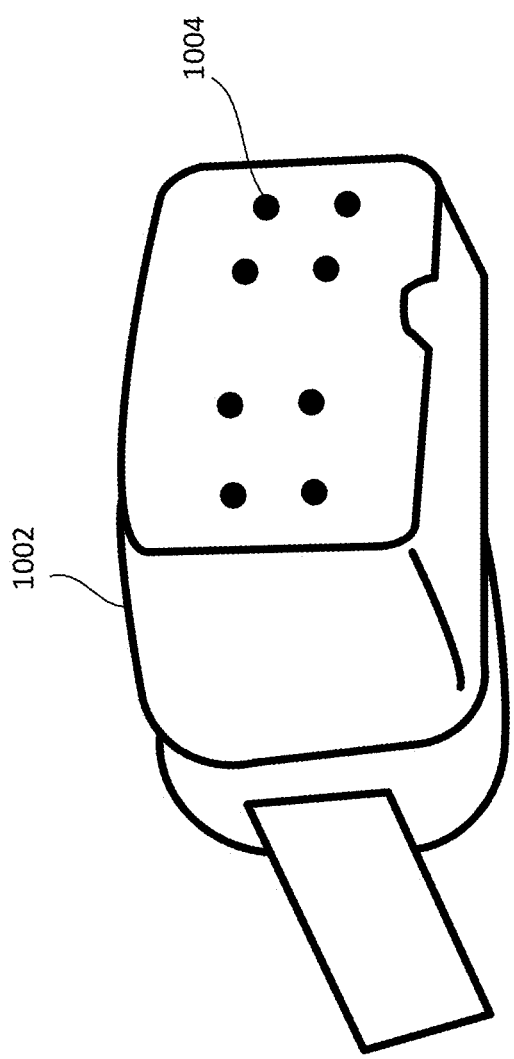
FIG. 10 illustrates virtual reality goggles having an internal camera according to an embodiment.

Referring now to FIG. 10, aspects of the present disclosure utilize mixed reality or virtual reality goggles 1002. In the illustrated embodiment, the goggles 1002 includes an internal camera array 1004 where one has cameras that face inward to look at the eyes, face, stress issues in/around the eyes, pupil dilatation, sweat, pulse, heart rate, etc. and other cameras that look externally to the particular environment to enhance the environment while one is using augmented reality, virtual reality, or mixed reality. In an aspect, the goggles 1002 include a display that fully covers the wearer's eyes to provide an image to the wearer in his or her central and peripheral vision. The camera array 1004 of the goggles 1002 provides visual data to a controller coupled to the goggles 1002.

In one embodiment, the controller is internal to goggles 1002. One can have one or multiple cameras either fixed to goggles 1002, fixed to the individual, or fixed to the room where one is working out of. The cameras external to goggles 1002 can be mobile device cameras. For example, two wrist watches with cameras can look at how an arm or leg may function in relationship to a certain procedure or certain activity and then can stimulate to enhance the arm and/or leg either through individual or through neurologic stimulation, electrical stimulation, or the like to change the motion pattern to enhance functional recovery and/or to improve function, speed, efficiency, reduce calories, etc. to make an operation faster whether it is in the surgical suite or whether it is in a work related environment to improve efficiencies and results. These can also be used for exoskeleton to make an operating system work. In an embodiment, the exoskeleton can be linked to sensors on a traditional body whether it is in the clothing, shoes, gloves, etc. where one can operate an exoskeleton robot or sync onto other individuals in an environment to enhance their functions or work-related capacities or potentially to link to robotic systems desired to function together. Robotic systems may be similar hydraulic, servomotor, etc. or they can be different types such as one might be ingestible, one might be external, or one might be servomotor. It allows one to operate multiple robotic systems and mechanical symptoms in synchrony using these type of concepts with wearables that are embedded in clothing, gloves, etc. linking these to video patterns, and then allowing one to link camera, sensors, etc. using either AR or VR and also audio to give these verbal cues. The verbal cues, again, can be used with new language based technologies with avatars, audio, etc. to allow more rapid motion patterns, more rapid functional patterns, rehabilitation, recovery, or improvement of functional activities for athletes, etc.

MirrorAR has two-dimensional imaging using mobile camera/mobile phone. RADiCAL uses four-dimensional, which includes acceleration and looks at rotational motion. These are predicates but can be used in addition to assess rehabilitation, recovery, neurologic injuries, concussions, or work-related issues by having a baseline and assessing baseline of multiple joints, including upper/lower extremities and spine in synchrony and then compare these to video a week, a month, and a year later. This looks for any changes, improvements, or deterioration in function. These can be used for athletic performance, musculoskeletal performance, and recovery from surgery. These can also be used for general rehabilitation and/or more importantly for medical records where one can diagnose more efficiently on a medical record. For example, one assesses a knee and subjectively one describes 10 to 90 degrees arc of motion. However, with this video-based program using a mobile device shooting at any angle and any direction without any external wearables one specifically sees range of motion not just of the knee, which can be documented, but in the same assessment one can also see the hip, spine, shoulder, upper extremities, etc. One can later follow if someone has a hip-based limp. One can also see diagnostics for the foot and ankle or other issues. This can be used for medical diagnosis not only but also for medical documentation to improve medical records. Companies such as Cerner or Epic use secondary data that is vocally recorded and is trying to use words to describe complex musculoskeletal motion patterns. This changes the whole concept, so one does see not a single joint but multiple joints. One can compare them with current mobile devices, so not just for remote medicine but also for musculoskeletal and neurologic treatments. In the office, one has this type of data. This can be used in surgery to determine what the diagnosis was but also what was done during surgery. One can link the audio to the video component so that one can actually hear opinions and statements as well as look at the body motion and then compare it a week, a month, and a year later using these types of algorithms to diagnose, treat, assess improvement/decay, and then warn individuals whether additional therapies or treatments are required.

As an example, if one does not improve quickly enough, does he or she need additional therapy and what type of therapy as well as what should one look for. This also aids a physical therapist to see where the patient's overall body function was. Again, with a simple video, one does not just look at the knee if the examination is based on the knee, but one can now look at the hips, spine, or other joints through motion. These can be proscribed motion. For example, one can do sitting to standing, kneeling, squatting, or jumping jacks looking at arms overhead or hands moving looking at multiple complex joints of the hands and wrists by setting up specific motion patterns. It may take one, two, or three seconds. They are stored in the Cloud and then compared to the same motion patterns on the next patient visit or from a home-based approach. These are then compared to see if there is any change. These can be used for diagnosis, treatment, or enhancing recovery/rehabilitation. It is also very useful for athletes. One can look for concussions, injuries, or recovery. It can help determine when one is able to return to work. One can use this for Worker's Compensation challenges. For example, it identifies if someone says I do not have back problems or hip problems, but take a video as the initial assessment of someone at work. One can then see if there is some limitation in function or motion. If someone comes back six months later and says my knee was injured at work; but, if one has documentation and there was decreased range of motion at the knee, limp at the knee, spine, or back, one can say I have definitive proof that one in fact did have limitations and work may not have directly caused the injury or there were pre-existing conditions affecting overall function. This can also be used to screen out patients, for example, who may have high risk for back problems or knee problems to avoid certain occupations. It can be used as a standard for assessing this and a risk management program. Human-Pose Estimation essentially takes video clips using mobile devices and then stores them to the Cloud. During this, they are quickly assessed for rotational moment around certain joints.

These can be then used in addition with wearables that one can wear on the arm or leg that may give more specific function about a specific joint and link these to the video or they can utilize general parameters such as look at a pulse oximeter or an Apple watch for example that might test EKG, pulses, blood pressure, etc. These are linked to the video assessment to then give the overall assessment. These can be done for remote patient care, but also to have a baseline. These can be stored in an individual's phone and computer or stored to the Cloud or at the doctor's office. One can compare one video to the next. With AI algorithms, even if one is 20, 30, or 40 degrees off with a camera or distance may be a foot or ten feet, one can assess these and then be able to compensate with AI algorithms to assess the distance and still look at rotational arc of motion and especially the acceleration, how quickly one moves as this also gives an insight into the patient's recovery or activity.

The same can be used for facial recognition. For example, at the same time one is looking at the arm or leg, one can see the stress on an individual's face and how hard one has to work. If one is in substantial pain, it can look at contraction around the eyes, sweating, stress, pupillary constriction dilatation. One can also combine these with wearables to look at sweating or other issues that may assess stress, pain, and function. These can also be used for testing for specific drugs or pharmaceutical success and/or efficacy. These can be used whether a pharmaceutical company is testing or whether physician is not finding the right medication. It helps determine whether the medication should be changed or if it is at all effective or not for that particular individual. This also links for example to other issues such as food intake, exercise, distance, movement patterns, time of day, or nighttime to link to success efficacy of medicine, dosage, and/or treatment.

Again, these Human-Pose Estimation concepts are looking at video motion assessments and can easily be done allowing remote patient care and monitoring, but further for documentation of the patient's medical conditions, recovery, diagnosis, treatment, therapy, etc., especially for musculoskeletal, neurological, etc.

Yet another use of this technology is as a replacement for a signature. One signs a letter and one's signature can be easily modified or copied by someone else. These can be used in specific patterns such as DocuSign or others. Rather than using DocuSign, we can create an entire system where one uses someone's body encryption or use a portion of a body, DNA, motion patterns to create a new or novel system. Rather than signing a document, one can scan and then place one's own DNA, skin patterns, hair patterns, etc. to create signature for signing a document for real estate, someone's will, moving finances or money. Again, this relates to blockchain where if someone wants to transfer different types of funding one can use these technologies to encrypt funding or to direct funding into specific technologies or locations, moving real estate, moving a will, or moving finances from one bank to another so banks have a novel way to encrypt or move technologies. For example, it can be from the Fed to a bank so it would not be copied or stolen using some of these technologies. These can also be used to translate to languages or create your own language so one can give confidential information from one source to another. For example, the 26 characters we have in the English language or the different characters or figures that are used in Asian languages, hieroglyphics, etc., one can create an emoji or some type of matched pattern where one can use a camera reversed upon themselves to do motion, discussion, or speech and then either audio, video, etc., to create new patterns to allow data communication which can then be back dropped and encrypted into a new pattern for a more universal language or for encryption based on letters, characters, sentences, action. These can be used for a single figure, single letter, sentence, paragraph, or entire motion platform can be used.

Another cause of changes in body composition is stress. In an embodiment, body tissue is stressed to look for specific tissue whether it is from medical diagnosis and encryption as these keys discussed above or whether it is looking at controls. One may have a reasonable vascular pattern. However, stresses such as static electricity, warm/cold air, fluid, and stimulants may change the way hair follicles or creases occur or cause other bodily changes. Temperature stresses, for example, cause pupils to dilate, sweating, etc. For example, if one wets the skin, it may look different and this can be another way to "encrypt or create security" so it is not simply standard. Adding heat to warm the skin causes the skin and blood vessels to dilate resulting in a vascular pattern change. Therefore, one may be able to use a stress concept in addition to standard to create further level of security encryption or control. One can look at this in a cubic centimeter area as an example and look at other ways to stress the tissue through other forms other than electrical, thermal, compression, external compression, suction, vacuum, etc.

The use of an AI system that combines the use of a visual and audio examples to detect if a person is lying, stressed, tired, etc. or not (can be used with a VR headset, such as shown in FIG. 10). One such example of a person most likely telling a lie is that their pupils dilate. This can also possibly detect concussions or other injuries (such as a concussion or a ACL tear) through a comparison to a baseline test.

In addition to determining unique bodily features for generating encryption keys to secure data and the like, aspects of the present disclosure are well-suited for discerning lies from truth. One cannot simply look at stressing the individual through questions, such as during a lie detector test, which essentially looks for electrical changes. Using video to look at musculature tick or motion patterns, for example, can reveal a "tell" that an individual has where one differs from another. As an example, when individuals play poker, they can detect if someone is cheating, lying, or telling the truth. One can use video or Human-Pose Estimation, but also looking at this from other mechanisms to test whether someone is accurate or inaccurate. This can be used for medical applications such as Worker's Compensation. It can be used for legal applications. It can also be used for other applications for even encryption. One can look at a standard video of an individual and then stressing individual whether through verbal cues such as questions, thermal, electrical, visual, etc. and see how the individual responds and using these possibly in combination with questioning to determine whether someone is telling the truth accurately or not. These can be started by looking at one's baseline activity and then using these Human-Pose Estimation or encrypted videos of the patient's face or body with not just single stress of questions but multiple stresses. These do not have to be severe. They can be superficial such static electricity or mild thermal changes to the room. It can be used by for example changing oxygen content. As the oxygen increases, one can change the stress or increase the carbon dioxide and then apply stress to an individual and then question. One can determine and/or compare if there is a change.

One can assess also legal accuracy in new standard rather than looking at simply a lie detector, which used electrical signals. One can then video and look very close at the eyes and assess for this. One can also strap-on through wearables, chemical sensors, sweat. The idea of hair follicles moving the affected vessels dilating or contracting which can use infrared as well as looking at dryness of mouth, facial tics, or "tell" as poker players call it where one can see if one has a change or repeated pattern. Again, this can be done through video assessment, i.e., Human-Pose Estimation where one can look at the body, scan it, and then have a baseline. If one identifies any changes with this, one is able to see if there is accuracy/inaccuracy of data or if someone's mental status, pain, etc. matches what they are actually broadcasting, saying, or doing.

Examining body segments for reactions to stress can also be used to determine diagnosis/activity, for example concussions or neurologic injuries. It can also be used to, for example, predict impending cardiac, neurologic, or other stress issues to the body. For example, diabetic stress testing has a patient ingest a huge amount of sugar in a liquid and then measure insulin levels and glucose levels. As the body responds and if the body responds abnormally, one can determine whether one is a pre-diabetic or at risk for diabetes. These same types of concepts can be used to follow individuals for accuracy or risks for other diseases. For example, if one stresses them, do they have appropriate response for hypertension or appropriate response for cardiac issues. Currently, one does a stress test for the heart where one can be put on a treadmill, elevate the treadmill gradually and progressively to see how their blood pressure responds. One can also add other variables as we discussed by changing the oxygen, changing the carbon dioxide, and changing the temperature. By following the response, one may be able to determine more granularly what type of cardiac disease this is specifically, whether it may be a metabolic disease such as thyroid versus cardiac, whether one may be secreting excessive amounts of epinephrine, or if one may have kidney or essential hypertension issues rather than cardiac issues as simple ways to enhance diagnostic capabilities. Again, looking at these, controlling the videos, measuring pre and post or during these activities and then adding stress components, this may enhance one's ability to diagnose not simply just for encryption, although these can all be part of the same challenges as we are aware certain people respond very poorly to stress or anxiety and they need anxiolytic medications.

Applying stress to individuals can be measured on different types of wearable devices, which are commonly available. If they are stressed appropriately, one can determine and place these in a program as they stress for specific parameters and measure this. They then look and see how the patient responds. For example, if we increase the oxygen in a room or if we stress them by increasing the carbon dioxide or increase the temperature two to four degrees either locally in the room or in the region or for example immersing a body part such as a foot in warmer fluid or having someone exercise, then one can see if their body changes in terms of their response. One can predict diseases by stressing the body and disease management. These can also be used for these security or encryption based technologies and can be measured easily by many wearable devices. These can be used for remote medicine. These can be done at home by individual or by not necessarily medical professionals but through remote patient care and monitored to assess. For example, if someone has asthma, how can one assess and control it. What is the stimulant for this? If one can stress in a local environment to follow this, one can be able to measure this. For example, mobile devices may be able to measure oxygen and carbon dioxide through inhaled or exhaled air. If someone has significant allergies to hay, for example, how they should respond and what medications should be taken may be determined based on the stress reaction caused by exposure to hay. One they medication is taken, how do they respond and if these parameters improved. These can then be sent in via the cloud or to health practitioner until HIPAA protected mechanisms to determine the treatments. This can change the way medicine is performed by doing individual stresses for individual diseases.

In yet another embodiment, adding encryption based on a 3D image, pattern, or motion can be used to replace or add to existing bar codes for pricing or inventory control or tracking or other scanning codes, keys to security, self-based encryption systems, keys, government issued IDs, and the like.

Embodiments of the present disclosure may comprise a special purpose computer including a variety of computer hardware, as described in greater detail herein.

For purposes of illustration, programs and other executable program components may be shown as discrete blocks. It is recognized, however, that such programs and components reside at various times in different storage components of a computing device, and are executed by a data processor (s) of the device.

Although described in connection with an example computing system environment, embodiments of the aspects of the invention are operational with other special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the example operating environment. Examples of computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the present disclosure may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the present disclosure may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments may be implemented with processor-executable instructions. The processor-executable instructions may be organized into one or more processor-executable components or modules on a tangible processor readable storage medium. Also, embodiments may be implemented with any number and organization of such components or modules. For example, aspects of the present disclosure are not limited to the specific processor-executable instructions or the specific components or modules illustrated in the figures and described herein. Other embodiments may include different processor-executable instructions or components having more or less functionality than illustrated and described herein.

The order of execution or performance of the operations in accordance with aspects of the present disclosure illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of the invention.

When introducing elements of the invention or embodiments thereof, the articles "a," "an," "the," and "said" are intended to mean that there are one or more of the elements. The terms "comprising," "including," and "having" are intended to be inclusive and mean that there may be additional elements other than the listed elements.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively, or in addition, a component may be implemented by several components.

The above description illustrates embodiments by way of example and not by way of limitation. This description enables one skilled in the art to make and use aspects of the invention, and describes several embodiments, adaptations, variations, alternatives and uses of the aspects of the invention, including what is presently believed to be the best mode of carrying out the aspects of the invention. Additionally, it is to be understood that the aspects of the invention are not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

It will be apparent that modifications and variations are possible without departing from the scope of the invention defined in the appended claims. As various changes can be made in the above constructions and methods without departing from the scope of the invention, it is intended that all matter contained in the above description and shown in the accompanying drawings shall be interpreted as illustrative and not in a limiting sense.

In view of the above, it will be seen that several advantages of the aspects of the invention are achieved and other advantageous results attained.

The Abstract and Summary are provided to help the reader quickly ascertain the nature of the technical disclosure. They are submitted with the understanding that they will not be used to interpret or limit the scope or meaning of the claims. The Summary is provided to introduce a selection of concepts in simplified form that are further described in the Detailed Description. The Summary is not intended to identify key features or essential features of the claimed subject matter, nor is it intended to be used as an aid in determining the claimed subject matter.

What is claimed is:

1. A method of generating an avatar associated with a user, the method comprising:
acquiring image data from a user, wherein the image data represents unique movements of the user;
identifying a movement pattern based on the acquired image data;
executing an image engine to generate a Human Pose Estimation based on the movement pattern;
generating the avatar associated with the user based on the Human Pose Estimation, wherein the avatar is a visual representation of the user;
storing the avatar in an electronic medical record of the user for use in assessing a medical condition of the user;
generating, based on the avatar, a key associated with the unique movements of the user; and
encrypting a data file using the key.

2. The method as set forth in claim 1, further comprising:
storing the avatar in a centralized database; and
forming a blockchain to define and render the avatar in the centralized database.

3. The method as set forth in claim 1, wherein the image data includes photographs or videos.

4. The method as set forth in claim 1, further comprising:
further executing an image engine to analyze the image data and convert the image data into a video language; and
sending the video language to a second user.

5. A system of creating an avatar-based language comprising:
a camera configured for imaging a user and acquiring image data representative thereof wherein, the image data represents unique movements of the user and includes gait data;
a centralized database;
a processor; and
a memory storage device, wherein the memory storage device stores processor-executable instructions that, when executed, configure the processor for:
translating the image data for the user into an avatar, wherein the avatar is representative of the unique movements of the user;
identifying a movement pattern based on the unique movements of the user;
executing an image engine configured to generate a Human Pose Estimation based on the movement pattern; and
generating the avatar associated with the user based on the Human Pose Estimation;
storing the avatar in the centralized database;
forming a blockchain to define and render the avatar in the centralized database;
generating, based on the avatar, a key associated with the unique movements of the user;
encrypting a data file using the key;
executing the image engine configured to determine whether subsequent image data matches the avatar, wherein the image engine is trained to create a confidence level for matching the avatar with the subsequent image data; and
unlocking the encrypted data file in response to the confidence level of the image engine indicating the subsequent image data matches the avatar within a predetermined threshold.

6. The system as set forth in claim 5, wherein the image data includes photographs or videos.

7. The system as set forth in claim 5, wherein the memory storage device stores processor-executable instructions that, when executed, further configure the processor for:
executing an image engine to analyze the image data and convert the image data into a video language;
sending the video language to a second user.

8. The system as set forth in claim 7, wherein the image engine comprises at least one of the following: a neural network; machine learning; machine vision; and artificial intelligence.

9. The system as set forth in claim 5, wherein the avatar is further representative of an expression of the user.

10. The system as set forth in claim 5, wherein unlocking the encrypted data file comprises at least one of the following: unlocking a smartphone, unlocking a computing device, decrypting the encrypted data file, unlocking a vehicle, and authorizing a transaction.

11. The method as set forth in claim 1, further comprising uploading the electronic medical record to the cloud for storage and processing.

12. The method as set forth in claim 1, wherein acquiring image data from the user comprises executing a video-based program on a mobile device.

13. The method as set forth in claim 1, wherein acquiring image data from the user comprises retrieving a set of proscribed motions to direct the unique movements of the user.

14. The method as set forth in claim 1, wherein generating the avatar comprises generating multiple avatars based on image data acquired at different times and further comprising comparing the avatars generated at the different times to each other for use in assessing the medical condition of the user.

15. The method as set forth in claim 1, further comprising acquiring audio data from the user and storing the audio data in the electronic medical record associated with the avatar.

16. The method as set forth in claim 1, wherein the electronic medical record is encrypted.

* * * * *